Feb. 11, 1958 J. B. HUTCHINSON 2,823,047
FREIGHT VEHICLES AND CONNECTING MEANS THEREFOR
Filed July 2, 1953

Jesse B. Hutchinson
INVENTOR.

BY

ATTORNEY

United States Patent Office 2,823,047
Patented Feb. 11, 1958

2,823,047

FREIGHT VEHICLES AND CONNECTING MEANS THEREFOR

Jesse B. Hutchinson, Dallas, Tex.

Application July 2, 1953, Serial No. 365,665

6 Claims. (Cl. 280—408)

This invention relates to freight vehicles and connecting means therefor and more particularly to a cart and a trailer connectable thereto.

An object of the invention is to provide a new and improved vehicle for transporting freight.

Another object of the invention is to provide a new and improved wheeled cart for handling freight.

Still another object of the invention is to provide, for combination with a cart of the character described, a trailer having a connecting means which permits pivotal movement of adjacent ends of the trailer and cart about a horizontal axis to facilitate passage of the trailer and cart over obstructions but which does not permit lateral pivotal movement of the trailer relative to the cart whereby a maximum load may be carried by the cart and trailer.

Additional objects and advantages of the invention will be readily apparent from the reading of the following description of devices constructed in accordance with the invention and reference to the accompanying drawings thereof, wherein.

Figure 1:
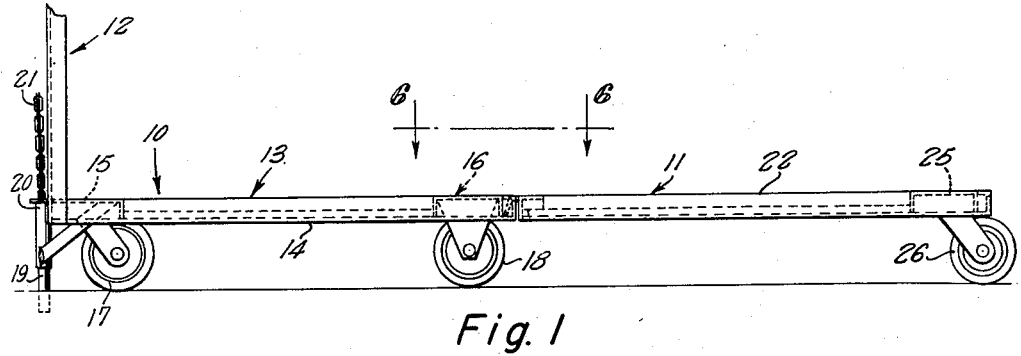
Figure 1 is a side view of the cart with the trailer attached.

Referring now to the drawing, the reference numeral 10 designates a cart to which is attached a trailer 11. The cart 10 includes an upright end frame 12 and a horizontal bed or floor 13. The bed 13 includes a rectangular frame formed of a pair of side angle members 14 and a pair of inverted channel end members 15 and 16 which extend between the side angle members at the ends thereof and are rigidly secured to the side angle members by welding or in any other suitable manner. Wood planking is supported on the angle members between the end members to form the load supporting surface of the cart.

The cart is supported on a pair of front caster wheels 17 and a pair of rear wheels 18. The front caster wheels are mounted for pivotal movement about vertical axes so that the cart may easily turn about corners.

The cart is also provided with a vertically movable connector pin 19 slidably mounted in a cylinder 20 rigidly secured to the front end of the cart. The connector pin may be raised by means of the chain 21 which is secured to the upper end of the pin. The connector pin is adapted to be lowered into a suitable channel in the floor to engage a moving chain (not shown) by means of which the cart may be moved along a prescribed path to convey freight.

The trailer 11 is of similar construction, having a bed 22 which includes a frame formed of a pair of side angle members 23 which are connected at their front ends by an end angle member 24 and at their rear ends by an inverted channel member 25 similar to the channel member 16 of the cart. Wood planking is supported on the side angle members 23 to form the load supporting surface of the trailer.

The trailer 11 has no front wheels, but is provided with a pair of rear caster wheels 26 which are mounted for pivotal movement about vertical axes so that the rear end of the trailer may turn with the cart.

The connecting means for attaching the front end of the trailer to the rear end of the cart includes a pair of substantially L-shaped connecting members 27 which are welded to the front end angle member 24 at the opposite ends thereof. The connecting members 27 have their dependent legs 28 spaced from the front end angle member 24 and extending downwardly and forwardly from said front angle member.

The dependent legs 28 are adapted to be inserted through apertures 29 formed in the web 30 of the rear channel member 16 of the cart, so that the dependent legs 28 of the connecting members engage the side flange 31 of the rear channel member to cause the trailer to move with the cart. The upper edge of the side flange 31 is cut away adjacent the aperture 29 so that the upper surfaces of the cart and the trailer will be flush, the connecting members 27 lying in such cut away sections of the side flange 31. A transverse member 32 may be secured to the web of the channel member 16, by welding or other suitable means, to form, with the side flange 31 and the web 30, sockets in which the dependent legs are received.

In use, the front end of the trailer is attached to the rear end of the cart by raising the front end of the trailer above the rear end of the cart and then lowering the front end of the trailer to insert the dependent legs 28 of the connecting members through the apertures 29 of the rear channel member 16. The trailer is thus connected to the cart at its opposite sides so that the rear end of the trailer cannot pivot about a vertical axis relative to the cart; or, in other words, the longitudinal axes of the trailer and cart will always be aligned. This permits the loading of long pieces of freight both on the cart and on the trailer and also prevents displacement of shorter pieces on the cart and trailer due to relative movement about a vertical axis between the cart and trailer.

Figure 2:
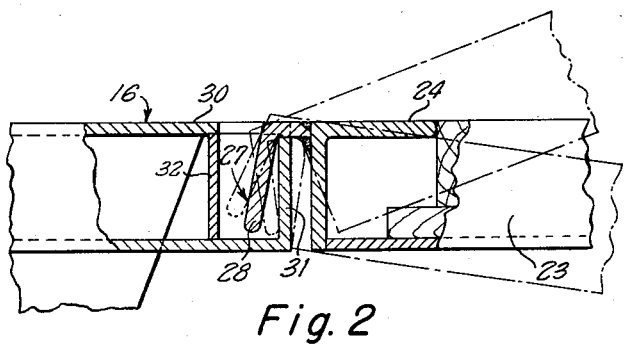
Figure 2 is a fragmentary partly sectional view showing one of the connecting means for connecting the trailer to the cart.
Figure 4:
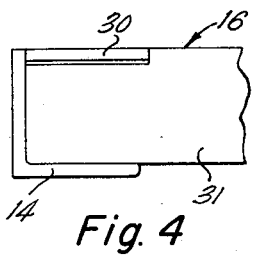
Figure 4 is a fragmentary end view of the cart showing one of the connecting means of the cart.
Figure 3:
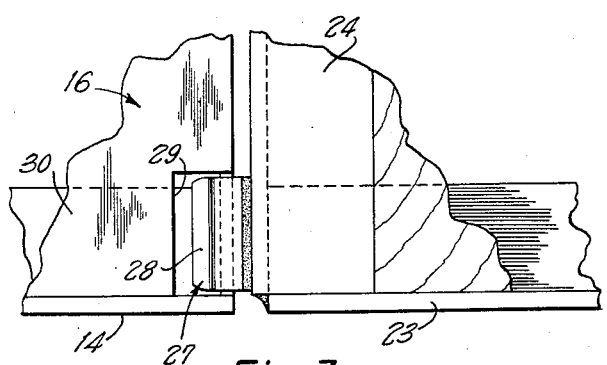
Figure 3 is a fragmentary top view of the connecting means shown in Figure 2.
Figure 5:
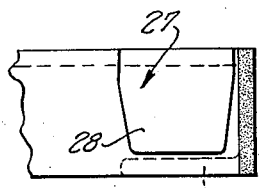
Figure 5 is a fragmentary end view of the trailer showing one of the connecting views of the trailer, and, Figure 6 is a fragmentary top view of the connection between the cart and trailer.
Figure 6:
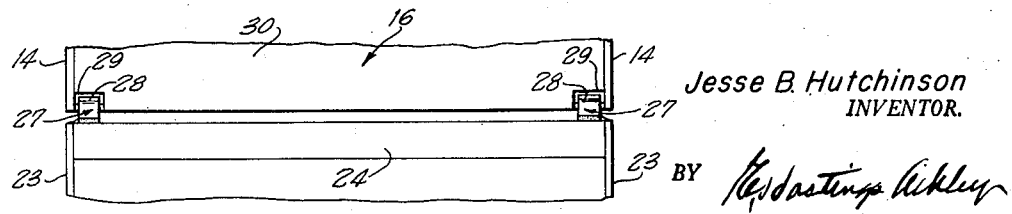

The connecting members 27, however, permit pivotal movement of the front end of the trailer relative to the rear end of the cart about a transverse horizontal axis, as is illustrated by the broken lines in Figure 2, so that the trailer may tilt or pivot about the horizontal axis when the cart and trailer are moved over uneven surfaces. This pivotal movement about a horizontal axis is facilitated by the disposition of the dependent legs 28 of the connecting members at an obtuse angle to angle members 24. This accommodation is necessary to prevent the cart and trailer from being subjected to excessive strains when the cart and trailer are moved over uneven surfaces, since the combined lengths of the trailer and cart is relatively long. It also permits the trailer to move up and down inclined surfaces or ramps, and the like, without disconnecting the trailer from the cart. The cart and trailer may be turned since the front caster wheels 18 of the cart and the caster wheels 26 at the rear of the trailer are pivotally secured to the cart and trailer respectively, for movement about vertical axes.

If desired, more than one trailer may be attached to the cart, since the rear end channel member 25 of each trailer is provided with end apertures similar to the end apertures 29 of the channel member 16 of the cart. Or, if desired, the apertures may be used as stake sockets for side or end boards.

It will be seen now that a new and improved cart 10 and trailer 11 have been provided which are easily connected by means of the connecting members 27 which engage in open topped sockets in the rear end of the cart formed by the apertures 29 of the web 30 of the rear channel member 16 of the cart. It will also be seen that the trailer may tilt about a horizontal axis relative to the cart when passing over uneven or inclined surfaces, but cannot pivot about a vertical axis relative to the cart due to the provision of two connecting members 27 at opposite sides of the trailer. Moreover, it will be apparent that the cart and trailer may be turned due to the provision of caster wheels 18 and 26 on the cart and trailer, respectively, which are adapted to pivot about vertical axes when the cart and trailer are turned.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A connector assembly for connecting a trailer to a cart including: an inverted channel member extending transversely of said cart at the rear end thereof, said channel member having a horizontal web and downwardly extending front and rear side flanges, said web being provided with a pair of apertures spaced transversely of the cart adjacent said rear side flange; and a pair of connecting members secured to the front end of said trailer, each of said connecting members having a forwardly extending portion substantially level with the top of said trailer and a dependent leg spaced forwardly of said front end and insertable in one of said apertures of said channel member whereby pivotal movement of said trailer about a vertical axis relative to said cart is prevented.

2. A connector assembly for connecting a trailer to a cart including: an inverted channel member extending transversely of said cart at the rear end thereof, said channel member having a horizontal web and downwardly extending front and rear side flanges, said horizontal web being provided with a pair of apertures spaced transversely of the cart adjacent said rear side flange; and a pair of connecting members secured to the front end of said trailer, each of said connecting members having a dependent leg spaced forwardly of said front end and insertable in one of said apertures of said channel member whereby pivotal movement of said trailer about a vertical axis relative to said cart is prevented, said dependent legs being loosely disposable in said sockets whereby pivotal movement of said trailer relative to said cart about a horizontal axis is possible.

3. A trailer connectable to a cart having a pair of laterally spaced open topped sockets adjacent its rear end and a pair of ground engaging wheels mounted adjacent said rear end, said trailer comprising: a rectangular bed; a pair of connecting members secured to the front end of said bed and each having a forwardly extending portion substantially flush with the upper surface of the bed and having downwardly extending legs spaced from the said front end and insertable in said sockets to connect said trailer to said cart, said connecting members allowing pivotal movement of said trailer relative to said cart about a transverse horizontal axis; a pair of ground engaging wheels pivotally connected to said bed adjacent the rear end thereof for movement about vertical axes, the engagement of said connecting members with said cart providing the sole support for the front end of said trailer, an inverted channel member extending transversely across the rear end of said rectangular bed and having a horizontal web and downwardly extending front and rear side flanges, said web being provided with a pair of apertures spaced transversely of the trailer and located adjacent the rear side flange, said apertures being adapted to receive the connecting members of another trailer.

4. A trailer for attachment to a cart comprising: a rectangular bed structure having a front end and a rear end, a pair of ground engaging wheels secured to said bed adjacent said rear end, said wheels being pivotable about vertical axes; a pair of transversely spaced connecting members secured to said front end, each of said connecting members having a dependent leg spaced forwardly of said front end and receivable in upwardly opening sockets provided in said cart, the engagement of said connecting members with the cart providing the sole support for the front end of the trailer, an inverted channel member extending transversely across the rear end of said rectangular bed and having a horizontal web and downwardly extending front and rear side flanges, said web being provided with a pair of apertures spaced transversely of the trailer and located adjacent the rear side flange, said apertures being adapted to receive the connecting members of another trailer.

5. A connector assembly for connecting a trailer to a cart having a flat, rectangular bed structure with a front end and a rear end, said assembly including a pair of laterally-spaced, open-topped apertures in said bed adjacent said rear end; and a pair of connecting members secured to the front end of said trailer, each of said connecting members having a forwardly extending portion substantially flush with both the top of the trailer and the surface of said bed and a dependent leg spaced forwardly of said front end of the trailer and insertable in one of said apertures whereby pivotal movement of said trailer about a vertical axis relative to said cart is prevented, said dependent legs being loosely disposable in said apertures whereby pivotal movement of said trailer relative to said cart about a horizontal axis is possible.

6. A connector assembly for connecting a trailer to a cart having a flat, rectangular bed structure with a front end and a rear end, said assembly including a pair of laterally-spaced, open topped apertures in said bed adjacent said rear end, and connecting members secured to the front end of said trailer, said connecting members including forwardly extending means substantially flush with both the top of the trailer and the surface of said bed and a pair of dependent legs spaced forwardly of said front end of the trailer and insertable in said apertures whereby pivoted movement of said trailer about a vertical axis relative to said cart is prevented, said dependent legs being loosely disposable in said apertures whereby pivotal movement of said trailer relative to said cart about a horizontal axis is possible.

References Cited in the file of this patent

UNITED STATES PATENTS

| | | |
|---|---|---|
| 526,395 | Johns | Sept. 25, 1894 |
| 1,513,717 | Mills | Oct. 28, 1924 |
| 2,179,586 | Carpenter | Nov. 14, 1939 |
| 2,198,270 | Maranville | Apr. 23, 1940 |
| 2,371,811 | Ericsson | Mar. 20, 1945 |
| 2,385,196 | Diesel | Sept. 18, 1945 |
| 2,587,208 | Peterson | Feb. 26, 1952 |
| 2,649,177 | Anderson | Aug. 18, 1953 |